Nov. 28, 1950 — P. SIEVER — 2,532,199
TIRE DEFLATION INDICATOR
Filed Feb. 4, 1950
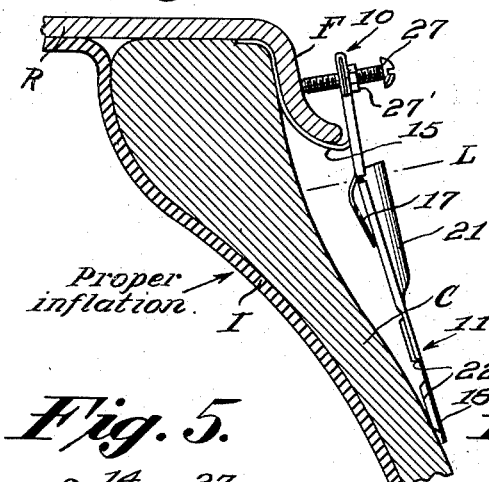
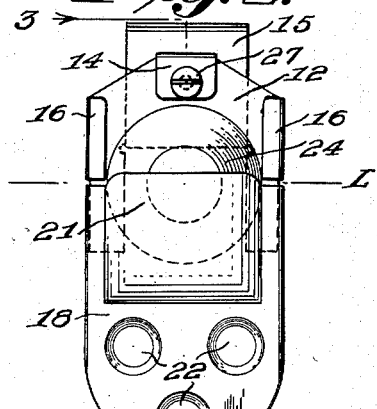
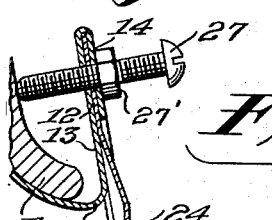
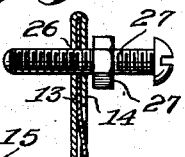
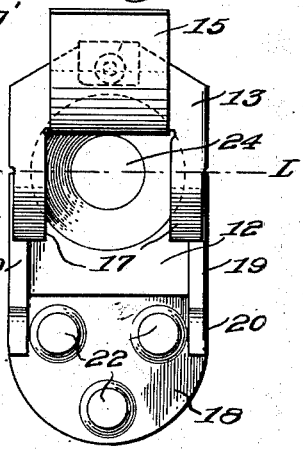
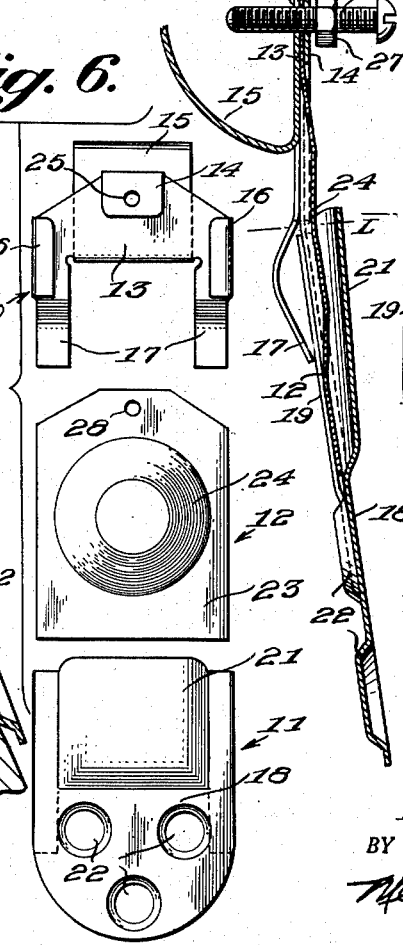
INVENTOR.
Paul Siever
BY Merchant & Merchant
ATTORNEYS.

Patented Nov. 28, 1950

2,532,199

UNITED STATES PATENT OFFICE 2,532,199

TIRE DEFLATION INDICATOR

Paul Siever, Minneapolis, Minn., assignor to Tire-Larm Co., Minneapolis, Minn., a corporation of Minnesota Application February 4, 1950, Serial No. 142,439

10 Claims. (Cl. 116—34)

This invention relates to a tire deflation indicator or alarm device which is constructed for ready attachment to and/or separation from the usual rim of an automobile wheel; the device being adapted when so mounted to merely engage the side wall of the tire for operation thereby without requiring special tools or other means for its application or special skill in the mounting and use of the device. More particularly the present invention is directed to improvements in the alarm device which forms the subject matter of applicant's co-pending application Serial No. 59,729, filed November 12, 1948, of which this application is to be considered a continuation-in-part.

As in the application referred to, the device herein shown and described comprises a support in the form of a wheel rim engageable bracket, which is relatively rigid and carries a simple adjustment screw for aiding in fastening the device upon the wheel rim and to impart the desired angular mounting to the device so as to position same into touching engagement with the side wall of the tire, for operation thereby.

In most prior art alarm devices of this character, wherein a clicking sound is produced by the bending of a portion of the device, the portion comprises an elongated resilient strip of thin sheet steel, or other suitable material, having a dimple impressed therein, to locally stiffen that portion of the plate, and cause it to snap back and forth when bent sufficiently to cause reverse bulging of the dimpled area. Examples of such structures appear in Patents 1,729,619 and 1,841,248.

Such structures have been found to provide little sensitivity and control for the reason that it is necessary to flex substantially the entire length of the strip protruding from the rim engageable bracket before the strip is sufficiently flexed to cause the required snapping action of the dimpled area. During this period the tire casing will be deflated to an undesired extent.

Some prior proposed structures of this general kind have, however, employed a relatively rigid tire casing engageable portion on the strip but in such proposed constructions the adjacent ends of the bracket and the relatively rigid end portion of the strip were spaced apart a distance at least as great as the diameter of the dimple, with the result that initial bending takes place in the flat areas at each side of the dimple, i. e. on two bend lines as a result, for examples of such structures see Patents 1,291,647 and 1,606,584. The desired extent of sensitivity was not provided or controllable.

There has been no means provided in such prior art devices for controlling the time or duration of the clicking action of the dimpled strip. It has been proposed however to overcome this inherent slowness of action by tensioning the dimpled strip against the side wall of the tire by various adjusting means as in Patent 1,606,584, so as to predetermine to a degree the time when the reverse bending and clicking action in the strip will occur in an attempt to give warning when a tire pressure has dropped only slightly below a predetermined inflated condition. All such attempts have failed either for slowness of action or as a result of frictional damage to the device and tire alike.

It has been found, however, that certain structural improvements are necessary for the successful application and operation of such a device as a deflation alarm or indicator on a tire equipped wheel, and this application is directed to such improvements as follows:

1. The provision of means to restrict the bending of the dimpled resilient strip to a single bending line which line extends transversely of the strip and intersects the central area of the bulge or dimple in the strip and/or;

2. To provide means to pretension the dimpled strip in partially bent condition in association with and by its own strengthening and supporting structure, wholly apart from the tire; or both.

It is accordingly an important object of this invention to provide an alarm device of the character referred to wherein the flexing of the dimple carrying strip is confined substantially to a single bend line extending transversely of the strip and through the central portion of the dimple.

A further object of the invention is to provide a device of the kind referred to embodying means whereby the device is capable of being pre-set apart from a tire to effect an angular relationship between the opposite end portions of the device together with a preparatory flexing of the intermediate dimpled strip to such a degree that a snapping action of the dimple will result upon substantially small further flexing of the strip as occasioned by a two or three pound loss in tire air pressure thereby rendering the device highly sensitive and satisfactory in use.

Other objects and advantages of the invention will become apparent in the course of the following detailed description, taken in connection with the accompanying drawing, wherein:

Fig. 1 is a fragmental transverse sectional view of a rim-supported pneumatic tire showing my invention operatively associated therewith and with the tire in properly inflated condition;

Fig. 2 is an outer face view of the improved alarm device in detached relation to the rim and tire, as viewed from the right of Fig. 1;

Fig. 3 is a substantially enlarged sectional view as observed in the plane of line 3—3 on Fig. 2;

Fig. 4 is an inner face view of the improved alarm device, or a view of the opposite side from that in Fig. 2;

Fig. 5 is a view similar to Fig. 3, a portion of a pneumatic tire and its supporting rim being shown and the alarm device being shown in sound producing position as occasioned by reduced air pressure in the tire;

Fig. 6 is an exploded view showing the three cooperating elements of the alarm device in disassembled relation.

Referring now in detail to the drawing by use of reference characters, the improved alarm device in accordance with a preferred embodiment of the invention comprises a relatively rigid anchoring bracket 10, a tire engageable relatively rigid plate 11 and a relatively thin sheet steel sound producing flexible strip 12 which is removably supported by the brackets 10 and plate 11.

The anchoring bracket 10 comprises a flat body portion 13 having an integral flange 14 bent over from the upper edge thereof and lying parallel with and in slightly spaced relation to the body portion 13. The lower edge of the flat body portion 13 is extended in the formation of an integral curved spring tongue 15 which is disposed on the side of body portion 13 opposite to that of the flange 14.

The tongue 15 is adapted to engage interiorly of the side tire retaining flange F of a rim R which supports a pneumatic tire including a casing C and an inner tube I.

The bracket 10 further includes oppositely inturned channel forming flanges 16 which are integral with and bent over from the opposite side portions of the body 13 into parallel and slightly spaced relation thereto. These channel forming flanges 16 are provided on the same side of the body portion 13, as is the bent over flange 14.

The body portion 13 is downwardly extended on each side of the tongue 15 in the provision of arched stop fingers 17, for a purpose later to appear.

The bracket 10 is preferably formed from a single sheet of relatively stiff metal by simple stamping and bending operations, since the flanges 14 and 16 are bent from the main body portion 13, the arched stop fingers 17 are downward extensions of the body portion and the tongue 15 is cut from the sheet of material between the stop fingers 17 and rolled back as shown.

The tire engaging plate 11 which cooperates with the bracket 10 is also formed from a single metallic sheet and comprises a main body portion 18 having a curved lower end as shown. The body portion is bent over at opposite sides thereof in the formation of channel shaped flanges 19 which together with opposed areas of the body portion provide guide ways for the resilient sounding strip 12, the extreme lower ends of the flanges 19 being depressed into engagement with the body portion 18, to provide anchoring stops for the strip 12 as indicated at 20.

The intermediate body portion 18 of the plate 11 is shown dished outwardly and away from the strip 12 in the formation of a sound amplifier 21 and the lower end portion of the plate is preferably provided with spaced and rounded tire engageable pressed out knobs 22, to reduce abrasion.

The sound producing strip 12 includes a normally flat body portion 23 of relatively thin resilient sheet material which is pressed out intermediate its ends in the formation of a relatively large dimple 24, which is preferably of a diameter equal to the distance between the flanges 16 and 19 thereby providing for maximum noise upon cupping of the dimple.

The upper edge portions of the strip 12 are receivable between and securely held by the body portion 13, of bracket 10, and the overlying channel forming flanges 16. The upper end of this strip 12 engages beneath the flange 14 which is provided with a threaded aperture 25 in alinement with a corresponding threaded aperture 26 in the body portion 13 for receiving a tire rim engageable adjusting screw 27, which also extends through an aperture 28 in the upper end of the strip 12, thus securing these parts together.

It is important to note that in the assembled position of the three cooperating elements 10, 11 and 12 as just described that the adjacent ends of the channel forming flanges 16 and 19 together with the opposed body portions 13 and 18 are essentially spaced only a slight distance apart so as to provide and permit only a single bend line L across the strip 12. It is further essential that this bend line intersects the central area of the circular dimple 24 and since the bracket 10 and plate 11 are substantially rigid, relative to the thin readily bendable strip 12, the device is thus bendable substantially in a thin line transversely of its width, as is clearly indicated by the line L, in each of Figs. 1 to 5.

The alarm is dependent upon a snap sound as effected by a reverse cupping action of the dimpled area upon bending of the resilient strip 12, on the line L. Since a substantial degree of bend of the plate from a flat position is required to effect such snapping action even with the line of bend traversing the center of the dimple, the fingers which are substantially rigid normally have their free ends engaged with flanges 19 at points substantially below the line L such that the strip 12 is initially bent on line L and the body portions 13 and 18 of the bracket 10 and plate 11 are at a substantial angle to each other as is clearly shown in Figs. 1 and 3.

Even with the substantially less degree of bend which is required to effect snapping action with the parts 10, 11 and 12 assembled to restrict such bending to the line L, it has been found desirable to provide a pretensioning means in the form of arched bridging fingers 17, which depend from the body 13 of the bracket 10 and engage the under side of the plate 11 along the inturned flanges 19, substantially beyond the line L. As is clearly shown in Figs. 1 and 3, these fingers 17 function to normally maintain the bracket 10 and the tire engaging plate 11 at a substantial angle to each other with the dimpled portion of the sounding strip 12 partially bent across the line L.

This preliminary bending or flexing of the sounding strip 12 on the line L may be effected to such extent that only slightly additional flexing is thereafter required to cause a cupping and snapping action of the dimple 24. Accordingly upon slight deflation of the tire, as indicated in Fig. 5, the alarm will be sounded and the noise effected by the dimple is substantially amplified by the member 21.

While the fingers 17 are shown as relatively rigid to effect the preliminary flexing of the strip 12, they are nevertheless adjustable whereby the preliminary flexing of the strip is predetermined to render the device sufficiently sensitive to sound the alarm when the tire is deflated to an extent slightly under its normal inflated condition.

Partial flexing of strip 12 is thus preset as in Fig. 3 prior to attachment of the device to the rim R.

With the device thus preset it is only necessary that the tongue 15 be seated within the flange F of the rim R, as in Fig. 1 and after proper inflation of the tire, the screw 27 is merely adjusted to swing the free end of the plate 11 against a side wall of the tire, whereupon the screw is preferably locked in such position as by means of a lock nut 27'.

From the above, it will be appreciated that an improved tire deflation alarm device has been provided which is durable, simple in construction, and highly sensitive and dependable in operation.

While I have disclosed my invention in accordance with a single specific structural embodiment thereof, such is to be considered as illustrative only, and not restrictive, the scope of the invention being defined in the sub-joined claims.

I claim:

1. A tire deflation alarm device comprising relatively rigid and relatively movable wheel rim and tire side wall engaging members respectively, and a dimpled resilient sound strip hingedly connecting said members and holding the opposed ends of the members in closely adjacent relation over a diameter of the dimple in said strip and providing therebetween a sharp bend line which intersects the central area of the dimple.

2. The structure defined in claim 1 wherein a stop is carried by one of said members and engages the other member across the bend line therebetween to normally maintain a predetermined angular relationship between the members and preliminary tension in said dimpled sound strip.

3. A tire deflation alarm device comprising a relatively rigid supporting member, an angularly disposed relatively movable tire side wall engaging member swingably connected to said supporting member, and an adjustable stop connected to one of said members and forceably engaging the other member to predetermine the angular relationship between said members.

4. A tire deflation alarm device comprising a relatively rigid wheel rim engaging supporting member, a relatively movable tire side wall engaging member rigidly connected thereto, said latter member comprising a dimpled resilient sound strip, and a stop carried by one of said members and engage the other to hold said resilient strip in partially bent and tensioned condition beyond said connection with its supporting member.

5. A tire deflation alarm device comprising a relatively rigid bracket adapted for connection with a tire rim, a resilient dimpled sound producing strip having an end portion thereof rigidly supported by said bracket, a tire engaging plate disposed outwardly of said bracket and having a free tire wall engaging end, the other end portion of said strip being rigidly connected to said tire engaging plate with the opposed ends of said bracket and plate in closely adjacent relation over a diameter of the dimple in said sound producing strip and providing a sharp bending line between said bracket and plate for flexing diametrically through the central area of said dimple upon predetermined angular deflection of said strip and plate relative to the supporting bracket as occasioned by a corresponding deflation of the tire side walls.

6. The structure according to claim 7, wherein said relatively rigid bracket and plate are each provided with opposite side flanges providing stiffening channels in which opposite end portions of the flexible strip are rigidly supported, and said dimple being disposed midway between said end portions and being of a diameter substantially greater than the distance between the adjacent edges of said channel forming flanges.

7. The structure according to claim 5, together with relatively rigid stop tongues extending from said bracket and spanning the space between the opposed adjacent ends of the bracket and plate and engaging the plate at points distant from said bend line for preliminary flexing of said plate, whereby said dimple will be cupped and a signal sound produced upon only slight further movement thereof.

8. A tire deflation alarm device comprising in its assembled position, a supporting bracket member including a relatively rigid plane body portion for disposal adjacent the free edge of a tire rim flange, a curved spring tongue integral with the body portion for disposal between the inner wall of the rim and an inflated tire supported thereon holding said body portion extended outwardly of the rim, a screw supported by the body portion and engaging the outer face of the rim flange for varying the angularity of the body portion relative to the general plane of the rim, an outer relatively rigid plate member having a free tire casing wall engageable end, the adjacent ends of said bracket and plate members being in closely spaced relation, relatively rigid inturned flanges on opposite sides of said bracket and plate members and providing aligned channel ways, a flexible sound producing strip having its opposite end portions disposed in said channels and providing a resilient hinge between said adjacent ends of the bracket and plate member, and a circular dimple in said strip having its central area spanning said space and extending beyond the adjacent ends of said channels.

9. The structure according to claim 10, together with a pair of relatively rigid tongues integral with the flanges on one of said members and having their free ends engaging the flanges on the other member for normally holding the members in angular relation and with the intermediate strip in predetermined flexed condition.

10. In a device of the class described, an elongated sound-producing tongue formed of a strip of resilient material and having a dimpled area between the ends thereof, a tongue end portion reenforcing and stiffening member mounted on and extending inwardly from each of the opposite ends of said tongue to adjacent points thereon which intersect the dimpled area thereof, whereby to provide between said points a transverse bending zone which is confined to and extends through the bulged area of the dimple, one of said reenforcing members having a wheel rim mounting portion, and an adjusting means carried by said one end and cooperating with the rim flange to position the opposite reinforced end of the tongue into engagement with a side wall of an inflated tire for operation thereby without initial tensioning of the tongue by said adjusting means.

PAUL SIEVER.

REFERENCES CITED

The following references are of record in the file of this patent:

UNITED STATES PATENTS

| Number | Name | Date |
|---|---|---|
| 1,482,737 | Clarke | Feb. 5, 1924 |
| 1,606,584 | Langham | Nov. 9, 1926 |
| 1,841,248 | Kirtley | Jan. 12, 1932 |
| 2,481,166 | Siever | Sept. 6, 1949 |